US012647052B2

(12) United States Patent
Liu et al.

(10) Patent No.: US 12,647,052 B2
(45) Date of Patent: Jun. 2, 2026

(54) SELF-POWER GENERATING SWITCH, PROCESSING METHOD THEREFOR, AND PROCESSING SYSTEM

(71) Applicant: Wuhan Linptech Co., Ltd., Wuhan (CN)

(72) Inventors: Yunzhen Liu, Wuhan (CN); Ying Jin, Wuhan (CN); Xiaoke Cheng, Wuhan (CN)

(73) Assignee: Wuhan Linptech Co., Ltd., Wuhan (CN)

( * ) Notice: Subject to any disclaimer, the term of this patent is extended or adjusted under 35 U.S.C. 154(b) by 230 days.

(21) Appl. No.: 18/761,590

(22) Filed: Jul. 2, 2024

(65) Prior Publication Data

US 2024/0356464 A1    Oct. 24, 2024

Related U.S. Application Data

(63) Continuation of application No. PCT/CN2023/071000, filed on Jan. 6, 2023.

(30) Foreign Application Priority Data

Jan. 10, 2022    (CN) .......................... 202210023759.6

(51) Int. Cl.
*H02N 11/00* (2006.01)
*H01H 13/14* (2006.01)

(52) U.S. Cl.
CPC ........... *H02N 11/002* (2013.01); *H01H 13/14* (2013.01)

(58) Field of Classification Search
CPC ................. H02N 11/002; H01H 13/14; H01H 2239/076; H01H 13/02; H02K 35/02; H03K 2017/9706; H03K 2217/94089; H02J 7/32; H02J 13/1333; H02J 13/1335; H02J 2105/12

USPC ....................................................... 310/12.27
See application file for complete search history.

(56) References Cited

U.S. PATENT DOCUMENTS

2021/0136667 A1    5/2021    Zhou

FOREIGN PATENT DOCUMENTS

| CN | 210983079 U | 7/2020 |
| CN | 111918448 A | 11/2020 |
| CN | 113410971 A | 9/2021 |

(Continued)

*Primary Examiner* — Charles Reid, Jr.

(57) ABSTRACT

The present invention provides a self-power generating switch, a processing method therefor, and a processing system. An electrical energy receiving module of the self-power generating switch is configured to transmit external electrical energy to a voltage output module when receiving the external electrical energy transmitted from the outside of the self-power generating switch; a communication processing module of the self-power generating switch is configured to execute network distribution of the self-power generating switch and a target network after the communication processing module and a storage module are powered on under the condition that the electrical energy receiving module receives the external electrical energy; the communication processing module is configured to generate a control message after the communication processing module and the storage module are powered on under the condition that a power generator converts mechanical energy into electrical energy, and send the control message by means of the target network.

20 Claims, 15 Drawing Sheets

(56)          References Cited

FOREIGN PATENT DOCUMENTS

CN          113517151  A      10/2021
CN          115276196  A      11/2022

113

1131

101

114

115

116

117

103

109

118

10721

113

101

119        118

101                     119

118        11011

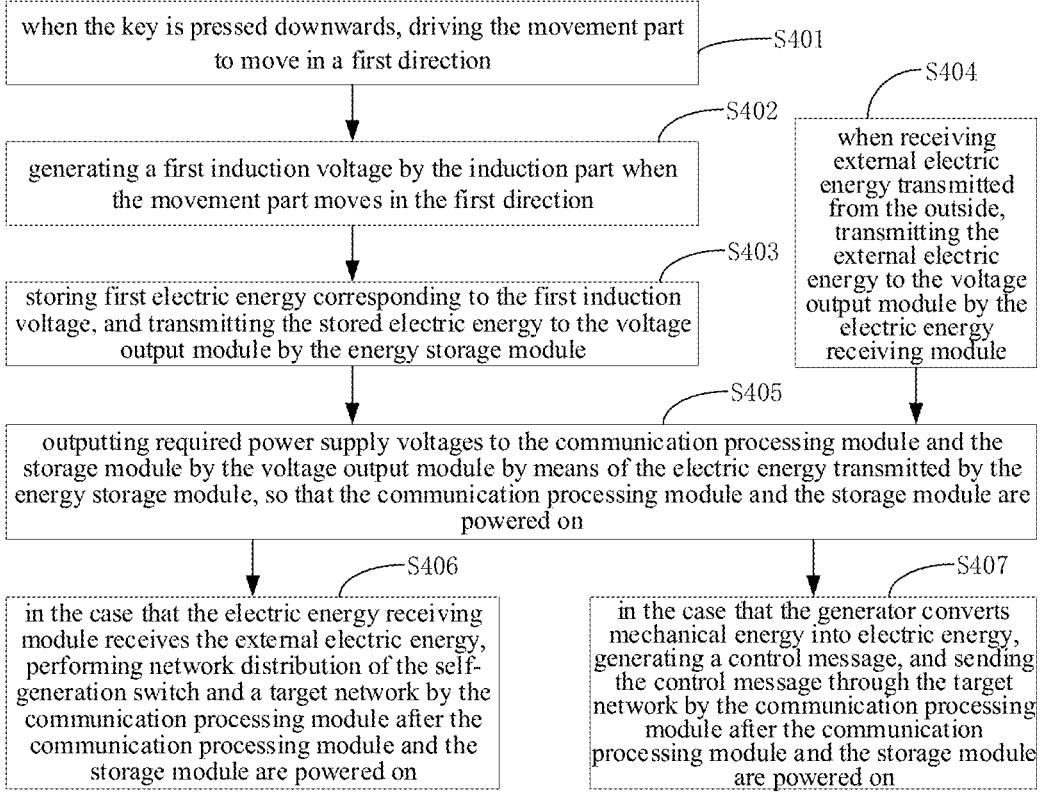

when the key is pressed downwards, driving the movement part to move in a first direction — S401 generating a first induction voltage by the induction part when the movement part moves in the first direction — S402 storing first electric energy corresponding to the first induction voltage, and transmitting the stored electric energy to the voltage output module by the energy storage module — S403 when receiving external electric energy transmitted from the outside, transmitting the external electric energy to the voltage output module by the electric energy receiving module — S404 outputting required power supply voltages to the communication processing module and the storage module by the voltage output module by means of the electric energy transmitted by the energy storage module, so that the communication processing module and the storage module are powered on — S405 in the case that the electric energy receiving module receives the external electric energy, performing network distribution of the self-generation switch and a target network by the communication processing module after the communication processing module and the storage module are powered on — S406 in the case that the generator converts mechanical energy into electric energy, generating a control message, and sending the control message through the target network by the communication processing module after the communication processing module and the storage module are powered on — S407

Fig. 15

SELF-POWER GENERATING SWITCH, PROCESSING METHOD THEREFOR, AND PROCESSING SYSTEM

TECHNICAL FIELD

The present invention relates to the field of self-power generating switches, in particular to a self-power generating switch, a processing method therefor, and a processing system.

BACKGROUND ART

A self-power generating switch can be understood as a switch configured with a power generator, and electrical energy required by a circuit in the switch can be supplied by electrical energy generated by the power generator. At the same time, a communication processing module can also be configured in the self-power generating switch, and then, the communication processing module is utilized for communication with the outside of the self-power generating switch.

In the existing related art, a network distribution process of the self-power generating switch can only be achieved by means of electrical energy generated by self-power generation of the self-power generating switch. However, the electrical energy generated by the self-power generation is limited, which greatly limits the volume of data transmitted and processed in the network distribution process, and will not be beneficial to the achievement of network distribution.

SUMMARY OF THE INVENTION

The present invention provides a self-power generating switch, a processing method therefor, and a processing system to solve the problem that electrical energy generated by self-power generation is limited.

According to a first aspect of the present invention, provided is a self-power generating switch, including:

at least one key, at least parts of the key are arranged to displace in response to an external action, and the external action including an action of downwardly pressing of the key;

a power generator, the power generator is arranged to convert mechanical energy into electrical energy in response to the displacement; and a switch circuit; the switch circuit includes a communication processing module, an energy storage module, a rectification module, a voltage output module, a storage module, and an electrical energy receiving module;

the power generator including an induction part and a movement part; the communication processing module being electrically connected to the storage module, the induction part being electrically connected to the energy storage module through the rectification module, and the energy storage module being electrically connected to the communication processing module and the storage module through the voltage output module; the key being directly or indirectly driven by the movement part; wherein the movement part is configured to be driven to move in a first direction when the key is pressed downwardly; the induction part is arranged to generate a first induction voltage in response to the movement of the movement part in the first direction; the rectification module is arranged to rectify first electrical energy corresponding to the first induction voltage and then storing the rectified electrical energy in the energy storage module; and the energy storage module is arranged to transmit the stored electrical energy to the voltage output module;

the electrical energy receiving module being directly or indirectly electrically connected to the voltage output module; and the electrical energy receiving module being configured to: when receiving external electrical energy transmitted from the outside of the self-power generating switch, transmit the external electrical energy to the voltage output module;

the voltage output module is arranged to output required power supply voltages to the communication processing module and the storage module by means of the transmitted electrical energy, so that the communication processing module and the storage module are powered on;

the communication processing module being configured to: in the case that the electrical energy receiving module receives the external electrical energy, perform network distribution of the self-power generating switch and a target network after the communication processing module and the storage module are powered on; and the communication processing module being configured to: in the case that the power generator converts the mechanical energy into the electrical energy, generate a control message, and send the control message through the target network after the communication processing module and the storage module are powered on.

According to a second aspect of the present invention, provided is a processing method for the self-power generating switch, wherein the self-power generating switch includes: at least one key, a power generator, and a switch circuit; the switch circuit includes a communication processing module, an energy storage module, a rectification module, a voltage output module, a storage module, and an electrical energy receiving module; the power generator includes an induction part and a movement part; the communication processing module is electrically connected to the storage module, the induction part is electrically connected to the energy storage module through the rectification module, and the energy storage module is electrically connected to the communication processing module and the storage module through the voltage output module; the key is directly or indirectly driven by the movement part; and the electrical energy receiving module is directly or indirectly electrically connected to the voltage output module; and the processing method includes:

when the key is pressed downwardly, driving the movement part to move in a first direction, generating a first induction voltage by the induction part when the movement part moves in the first direction, storing first electrical energy corresponding to the first induction voltage, and transmitting the stored electrical energy to the voltage output module by the energy storage module;

when receiving external electrical energy transmitted from the outside of the self-power generating switch, transmitting the external electrical energy to the voltage output module by the electrical energy receiving module;

outputting required power supply voltages to the communication processing module and the storage module by the voltage output module by means of the electrical energy transmitted by the energy storage module, so that the communication processing module and the storage module are powered on;

in the case that the electrical energy receiving module receives the external electrical energy, performing network distribution of the self-power generating switch and a target network by the communication processing module after the communication processing module and the storage module are powered on; and in the case that the power generator converts mechanical energy into electrical energy, generating a control message, and sending the control message through the target network by the communication processing module after the communication processing module and the storage module are powered on.

According to a third aspect of the present invention, provided is a processing system based on a switch, including the self-power generating switch in the first aspect, or the self-power generating switch for performing the processing method in the second aspect, and the target network.

In the self-power generating switch as well as the processing method and system therefor provided by the present invention, in the case that the power generator, the rectification module and the energy storage module are used to achieve the generation and use of self-generated electrical energy, the electrical energy receiving module is further used to receive the electrical energy from the outside of the self-power generating switch; at the same time, for the electrical energy received from the outside of the self-power generating switch and the electrical energy generated by the self-power generation, network distribution is achieved by means of the electrical energy received from the outside of the self-power generating switch, and then, the volume of data transmitted and processed in a network distribution process is no longer limited by the self-generated electrical energy; and the present invention is beneficial to the achievement of a more complicated network distribution process.

BRIEF DESCRIPTION OF THE DRAWINGS

In order to describe the technical solutions in the embodiments of the present invention or the prior art more clearly, the accompanying drawings required for describing the embodiments or the prior art will be briefly introduced below. Apparently, the accompanying drawings in the following description show only some embodiments of the present invention, and those of ordinary skill in the art may still derive other accompanying drawings from these accompanying drawings without creative efforts.

FIG. 15 is a schematic flow diagram of a processing method for a self-power generating switch in an embodiment of the present invention.

DESCRIPTION FOR REFERENCE NUMERALS IN THE ACCOMPANYING DRAWINGS

Figure 1:
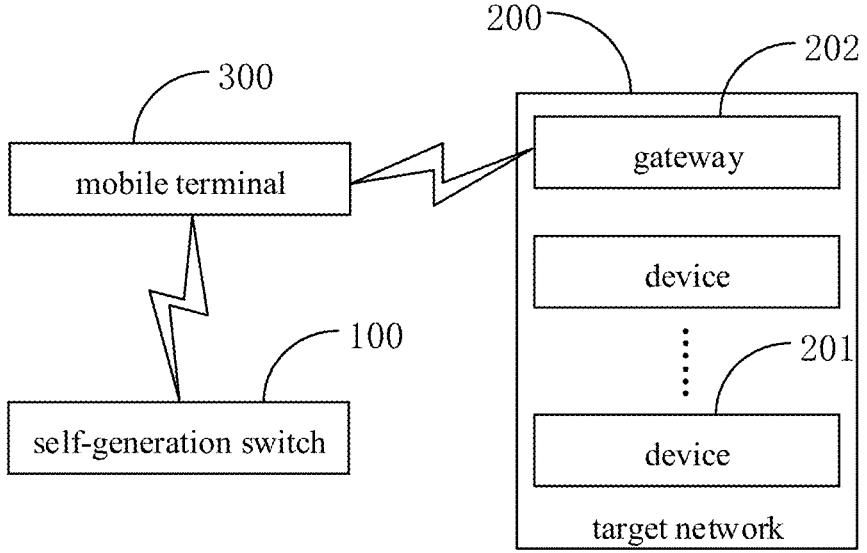
FIG. 1 is a schematic structural diagram of a processing system in an embodiment of the present invention.

101—key; 102—communication processing module; 103—power generator; 1301—movement part; 1032—induction part; 104—rectification module; 105—energy storage module; 106—voltage output module; 107—electrical energy receiving module; 1071—power supply interface; 1072—wireless charging unit; 1073—rectification unit; 108—storage module; 109—reset component; 110—key recognition module; 1101—detection unit; 11011—first conductive part; 11012—second conductive part; 112—LED module; 113—bottom shell; 1131—connecting hole; 114—light guide component; 115—middle shell; 116—waterproof set; 117—driving component; 118—circuit board; 119—silica gel column; 120—external electrical energy detection module; 200—target network; 201—device; 202—gateway; 300—mobile terminal; R1—first voltage division resistor; R2—second voltage division resistor; C1—detection feedback capacitor; and D1—power supply diode.

DETAILED DESCRIPTION OF THE INVENTION

The technical solutions in the embodiments of the present invention will be described clearly and completely below in conjunction with the accompanying drawings in the embodiments of the present invention. Apparently, the described embodiments are only a part of the embodiments of the present invention, not all the embodiments. Based on the embodiments of the present invention, all other embodiments obtained by those of ordinary skill in the art without creative efforts shall fall within the protective scope of the present invention.

In the description of the specification of the present invention, it should be noted that directional or positional relationships indicated by terms such as "upper part", "lower part", "upper end", "lower end", "lower surface" and "upper surface" are directional or positional relationships based on the accompanying drawings, are only intended to facilitate describing the present invention and simplifying the description, rather than to indicate or imply that the appointed device or element has to be located in a specific direction or structured and operated in the specific direction so as not to be understood as restrictions on the present invention.

In the description of the specification of the present invention, terms "first" and "second" are only for a purpose of description, and cannot be understood as indicating or implying the relative importance or implicitly indicating the number of indicated technical features. Therefore, the features defined as "first" and "second" may explicitly or implicitly include one or more of the features.

In the description of the present invention, "a plurality of" means more, such as two, three, and four, unless it may be specifically defined otherwise.

In the description of the specification of the present invention, terms, such as "connection", should be understood in a broad sense unless otherwise specified and defined, for example, it may be fixed connection or detachable connection or an integral whole, may be mechanical connection or electrical connection or mutual communication, may be direct connection or indirect connection through an intermediate medium, and may be internal connection of two elements or interaction between two elements. For those of ordinary skill in the art, the specific meanings of above terms in the present invention may be understood according to specific situations.

The technical solutions of the present invention will be described in detail below with specific embodiments. The following specific embodiments can be combined with each other, and the same or similar concepts or processes may be no longer repeated in some of the embodiments.

Figure 2:
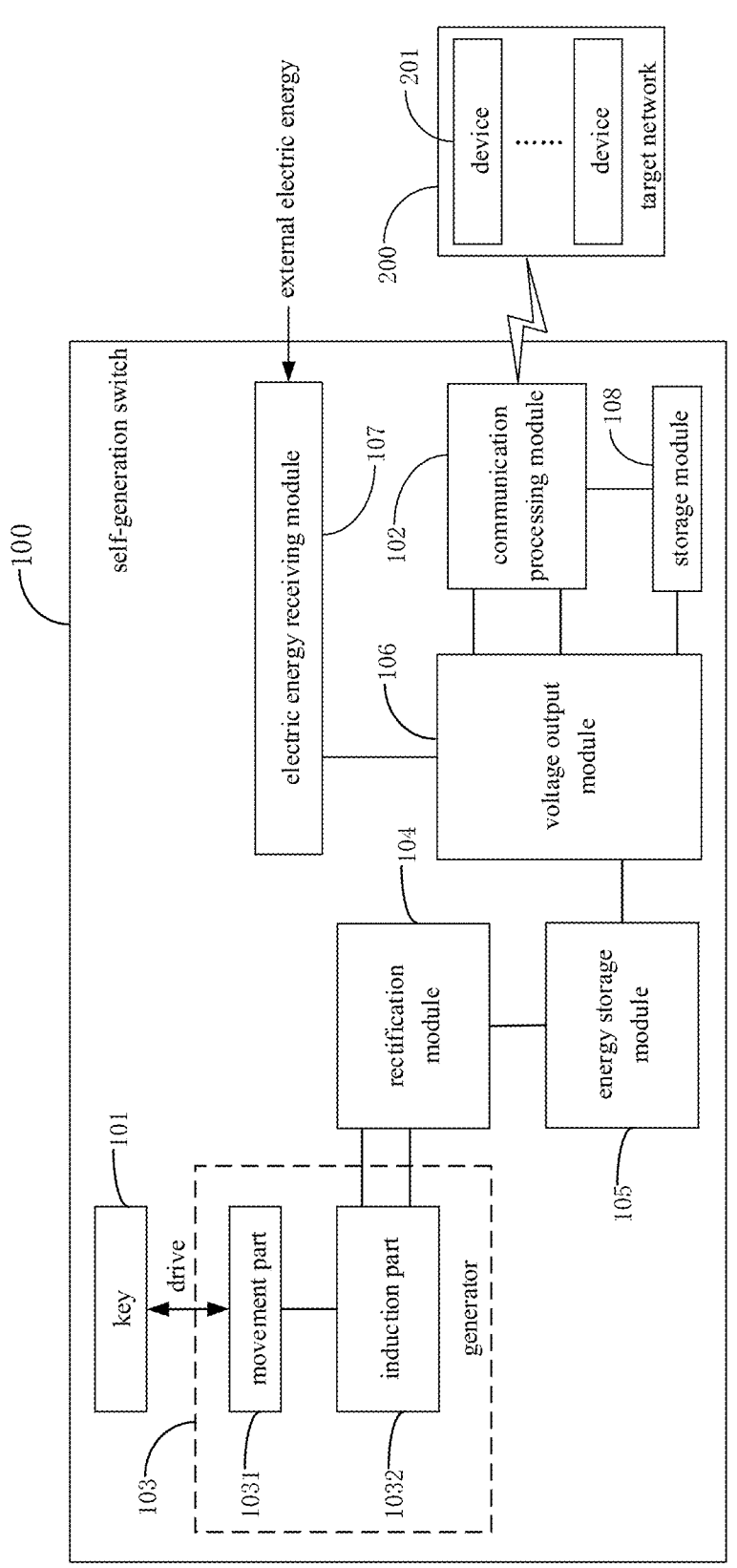
FIG. 2 is a first schematic structural diagram of a self-power generating switch in an embodiment of the present invention.

Refer to FIG. 1 and FIG. 2, embodiments of the present invention provide a processing system based on a switch, and also provide a self-power generating switch 100 and a processing method therefor, wherein the processing system includes the self-power generating switch 100.

In addition, in the processing system, refer to FIG. 1, a target network 200 can also be included, and the target network 200 can be a Zigbee network or a Bluetooth network.

A gateway 202 can be any apparatus capable of forming and/or managing the corresponding target network 200 or any combination of the apparatuses, and there can be one or more gateways 202, which is not limited thereto. In a specific example, the gateway 202 is a gateway device or a sound box with a gateway function.

Devices 201 in the target network 200 can include, for example, at least one of an intelligent wall switch, an intelligent curtain, and an intelligent lamp. These devices 201 can be controlled by a control message sent by the self-power generating switch to perform corresponding actions.

In one of implementations, the processing system can further include a mobile terminal 300 which can achieve communication with the self-power generating switch and the device and/or gateway in the target network, wherein the communication can be direct or indirect. The mobile terminal 300 can be a mobile phone, a tablet personal computer, a computer, etc. In addition, the mobile terminal 300 can also acquire the control message of the self-power generating switch, thereby being controlled or achieving the forwarding of the control message, or achieving control based on the control message.

In an example, the specified device in the target network is further configured to:
  receive the control message through the target network, and send the control message to the cloud; and
  the mobile terminal is further configured to: acquire the control message from the cloud.

In an example, a network distribution process of the self-power generating switch can depend on the mobile terminal 300, and then, the mobile terminal is configured to send safety information (such as a network access password) of the target network to the self-power generating switch when performing the network distribution.

In an example, a network distribution process of the gateway can depend on the mobile terminal 300, and then, the mobile terminal is further configured to send the safety information (such as a network access password) to the gateway, so that the gateway is added into the target network.

Refer to FIG. 2, the self-power generating switch 100 provided in an embodiment of the present invention includes:
  at least one key 101, at least parts of the key is arranged to displace in response to an external action, and the external action including an action of downwardly pressing of the key;
  a power generator 103, the power generator is arranged to convert mechanical energy into electrical energy in response to the displacement; and
  a switch circuit; the switch circuit including a communication processing module 102, an energy storage module 105, a rectification module 104, a voltage output module 106, a storage module 108, and an electrical energy receiving module 107.

The power generator 103 includes an induction part 1032 and a movement part 1031;
  the movement part 1031 can be understood as one or a combination of parts which can be driven by at least one of the key, a reset component, etc. to move; the induction part 1032 can be understood as one or a combination of parts which can interact with the movement part 1031 to generate electrical energy by induction when the movement part moves; and any structure capable of generating electrical energy based on movement in the art can be used as an optional solution of the embodiment of the present invention.

In a specific example, a permanent magnet part, a magnetic conduction part and a coil part can be configured in the power generator 103, the coil part can be disposed on the magnetic conduction part, and then, when the permanent magnet part moves relative to the magnetic conduction part, the coil part can generate an induction voltage. The coil part can be regarded as above-mentioned induction part 1032, and the permanent magnet part or magnetic conduction part can be regarded as above-mentioned movement part 1031, that is, in parts of examples, the permanent magnet part moves, thereby being directly or indirectly driven together with the key, the reset component, etc.; and in other parts of examples, the magnetic conduction part moves, thereby being directly or indirectly driven together with the key, the reset component, etc. It can be seen that the induction part 1032 may move with the movement part 1031, or not move with the movement part 1031.

The communication processing module 102 is electrically connected to the storage module 108, the induction part 1032 is electrically connected to the energy storage module 105 through the rectification module 104, and the energy storage module 105 is electrically connected to the communication processing module 102 and the storage module 108 through the voltage output module 106; the key is directly or indirectly driven by the movement part;

wherein the movement part is configured to be driven to move in a first direction when the key is pressed downwardly; the induction part is arranged to generate a first induction voltage in response to the movement of the movement part in the first direction; the rectification module is arranged to rectify first electrical energy corresponding to the first induction voltage and then storing the rectified electrical energy in the energy storage module; and the energy storage module is arranged to transmit the stored electrical energy to the voltage output module.

The electrical energy receiving module 107 is directly or indirectly electrically connected to the voltage output module 106; and the electrical energy receiving module 107 is configured to: when receiving external electrical energy transmitted from the outside of the self-power generating switch 100, transmit the external electrical energy to the voltage output module;

the voltage output module 106 is arranged to output required power supply voltages to the communication processing module and the storage module by means of the transmitted electrical energy, so that the communication processing module and the storage module are powered on;

the communication processing module 102 is configured to: in the case that the electrical energy receiving module receives the external electrical energy, perform network distribution of the self-power generating switch and a target network after the communication processing module and the storage module are powered on; and the communication processing module 102 is configured to: in the case that the power generator converts the mechanical energy into the electrical energy, generate a control message, and send the control message through the target network after the communication processing module and the storage module are powered on.

The voltage output module 106 can, for example, perform voltage conversion (such as voltage reduction and/or voltage stabilization) on the received electrical energy, and then, transmit the converted voltage to the communication processing module 102 and the storage module 108 to supply power to the same, so that they are powered on.

Figure 3:
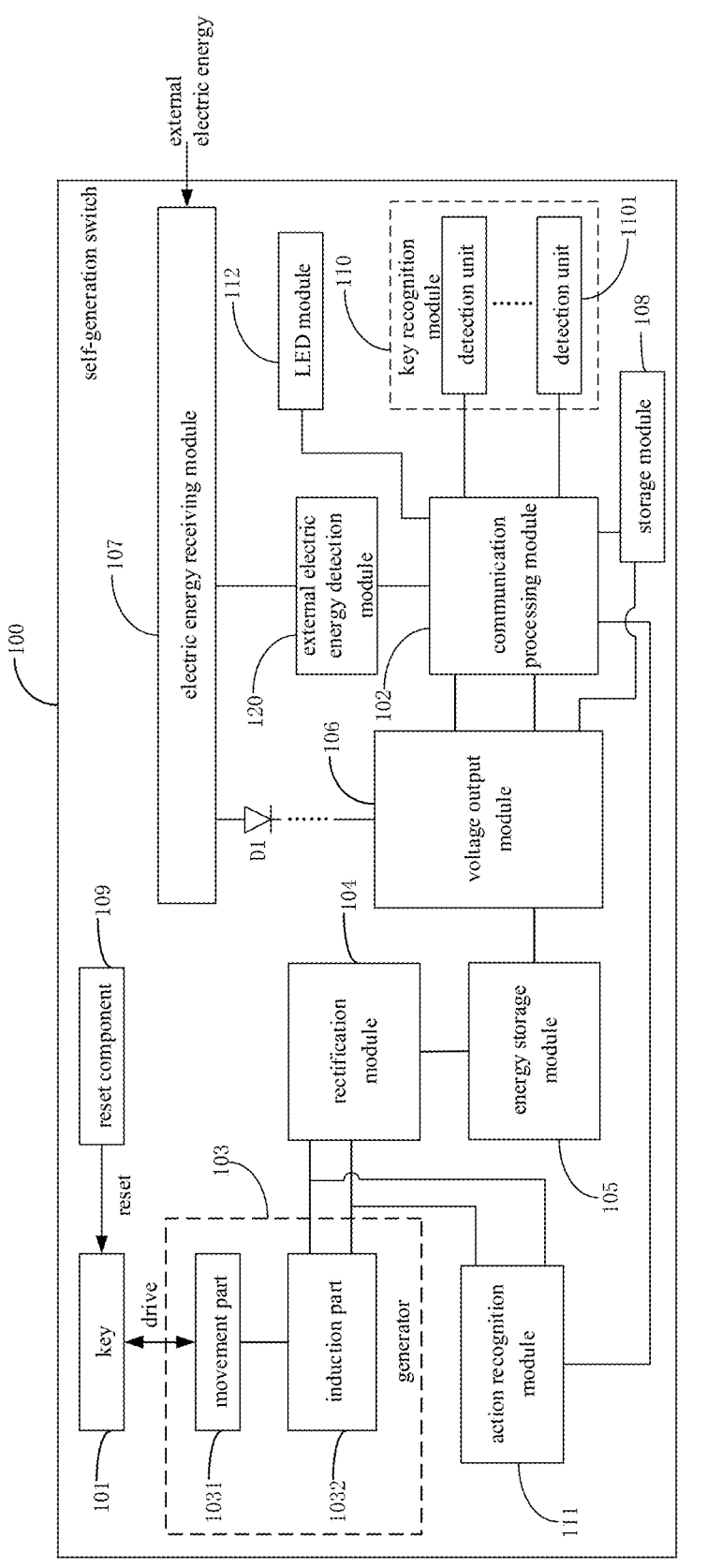
FIG. 3 is a second schematic structural diagram of a self-power generating switch in an embodiment of the present invention.

In parts of solutions, refer to FIG. 3, the self-power generating switch 1 further includes a reset component 109.

The reset component 109 is configured to be directly or indirectly driven by the movement part 1031 of the power generator 103, the reset component 109 is configured to deform in response to the movement of the movement part 1031 in the first direction and generating a reset action force overcoming the deformation, and the reset component 109 is further configured to drive the movement part 1031 to move in a second direction and the key to rebound by means of the reset action force after an action force for downwardly pressing of the key is removed;

a second induction voltage can be generated when the movement part moves in the second direction; and the rectification module 104 can be further configured to store second electrical energy corresponding to the second induction voltage into the energy storage module.

The storage module 108 can be configured to store current channel information. Specifically, the current channel information can be stored in the storage module 108 based on any processing process and interaction way. The storage module 108 can be a memory in which data is not lost after being powered down.

At the same time, the storage module 108 can also be configured to only work after being powered on and be powered down after work. Therefore, due to above configuration for the storage module, the storage module 108 can ensure the storage and maintenance of above information and guarantee the accuracy of the information.

In addition, the self-power generating switch 1 can further include a memory integrated into the communication processing module 102, and the memory can store, for example, codes required by the processing of the communication processing module 102.

In addition, the storage module 108 can be integrated into the communication processing module 102 or independent of the communication processing module 102.

In above solutions, in the case that the power generator, the rectification module and the energy storage module are used to achieve the generation and use of self-generated electrical energy, the electrical energy receiving module is further used to receive the electrical energy from the outside of the self-power generating switch 100; at the same time, for the electrical energy received from the outside of the self-power generating switch 100 and the electrical energy generated by the self-power generation, network distribution is achieved by means of the electrical energy received from the outside of the self-power generating switch 100, and then, the volume of data transmitted and processed in a network distribution process is no longer limited by the self-generated electrical energy; and the present invention is beneficial to the achievement of a more complicated network distribution process.

In one of implementations, before performing network distribution of the self-power generating switch and a target network, the communication processing module 102 is further configured to: determine that the self-power generating switch is in a network undistributed state and/or determine that the self-power generating switch is in a network distributed state, but is detected to find a reset operation.

The reset operation is configured to indicate the communication processing module to reperform the network distribution. The reset operation can be, for example, an operation of a user for a reset button (or the key 101), which can be pressing once or more times (such as three times and five times) or long pressing.

Then, network distribution is only performed when network distribution is not performed, or the external electrical energy is received, or network distribution is performed, but reset is needed, which avoids the unnecessary performing of a network distribution process, is beneficial to the reduction of energy consumption, and meets a network distribution demand of the user.

In one of implementations, when performing network distribution of the self-power generating switch and a target network, the communication processing module is specifically configured to: send a network distribution message to the outside of the self-power generating switch 100, so that a mobile terminal acquiring the network distribution message feeds safety information (such as the network access password) of the target network back to the self-power generating switch; and then, store the safety information (such as the network access password) into the storage module.

In above solution, by storing the safety information, network distribution can be achieved, and then, communication and control of the self-power generation for the device in the target network can be achieved based on the stored safety information, that is, the use of the target network is achieved.

Above description is only an example of network distribution, which can be understood as that the target network is an example of the Bluetooth network.

In one of implementations, the communication processing module 102 is further configured to: in the case that the electrical energy receiving module receives the external electrical energy, after the network distribution is completed, take a channel of the target network as a target channel, and store information of the target channel into the storage module; and correspondingly, the control message is sent through the target channel.

It can be seen that, during network distribution, the determination of the target channel can be further achieved, which provides guarantee for the sending and control of the control message.

When performing network distribution of the self-power generating switch and a target network, the communication processing module is specifically configured to:

send a channel seeking message by means of a current channel; and if a response signal of the channel seeking message is received, send a network distribution message by means of the current channel, so that a gateway of the target network adds the self-power generating switch into the target network; and when taking a channel of the target network as a target channel, and storing information of the target channel into the storage module, the communication processing module is specifically configured to:

if the response signal of the channel seeking message is received, take the current channel as the target channel, and store the information of the target channel into the storage module; and if the response signal of the channel seeking message is not received, switch a channel, and taking the switched channel as a new current channel, so that the channel seeking message is sent through the new current channel.

It can be seen that, in above solution, by polling the signal, the determination of the target channel is achieved, for example, it can be applied to a situation when the target network is the Zigbee network.

Any processing process capable of achieving network distribution in the field does not depart from the scope of the embodiments of the present invention, and is not limited to examples of above implementations.

Figure 4:
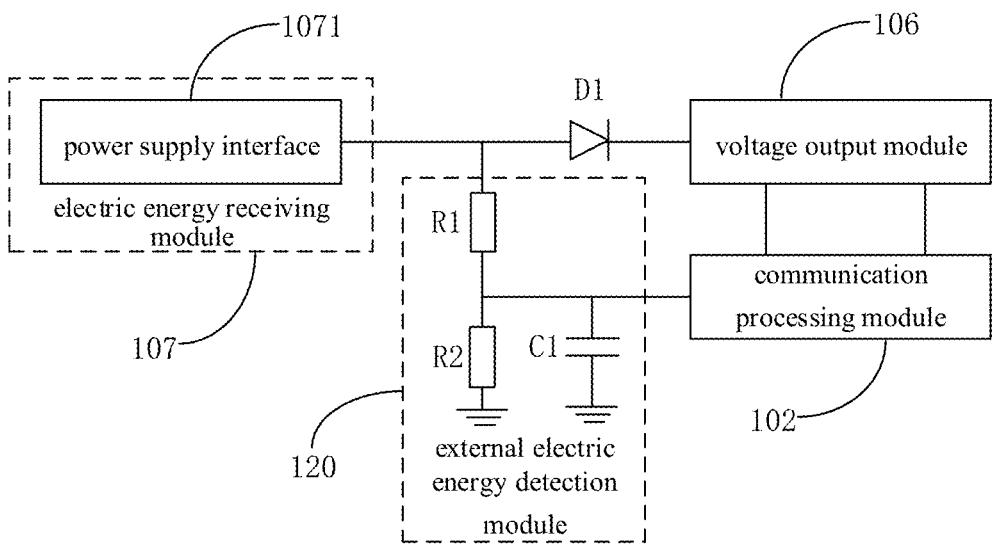
FIG. 4 is a first schematic diagram of a local structure of a self-power generating switch in an embodiment of the present invention.
Figure 5:
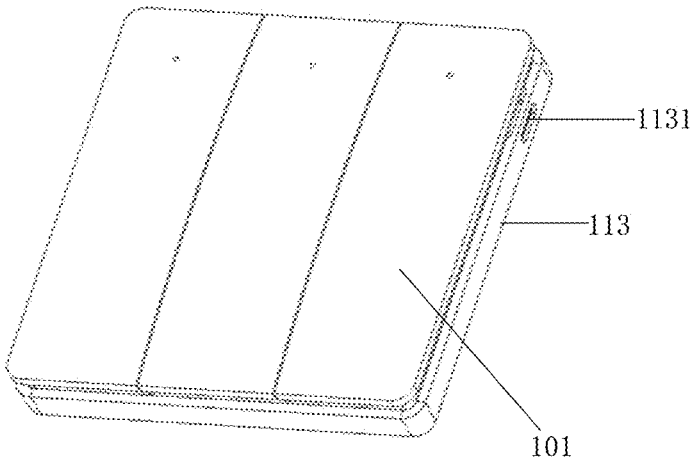
FIG. 5 is a schematic structural diagram of a self-power generating switch in an embodiment of the present invention.
Figure 6:
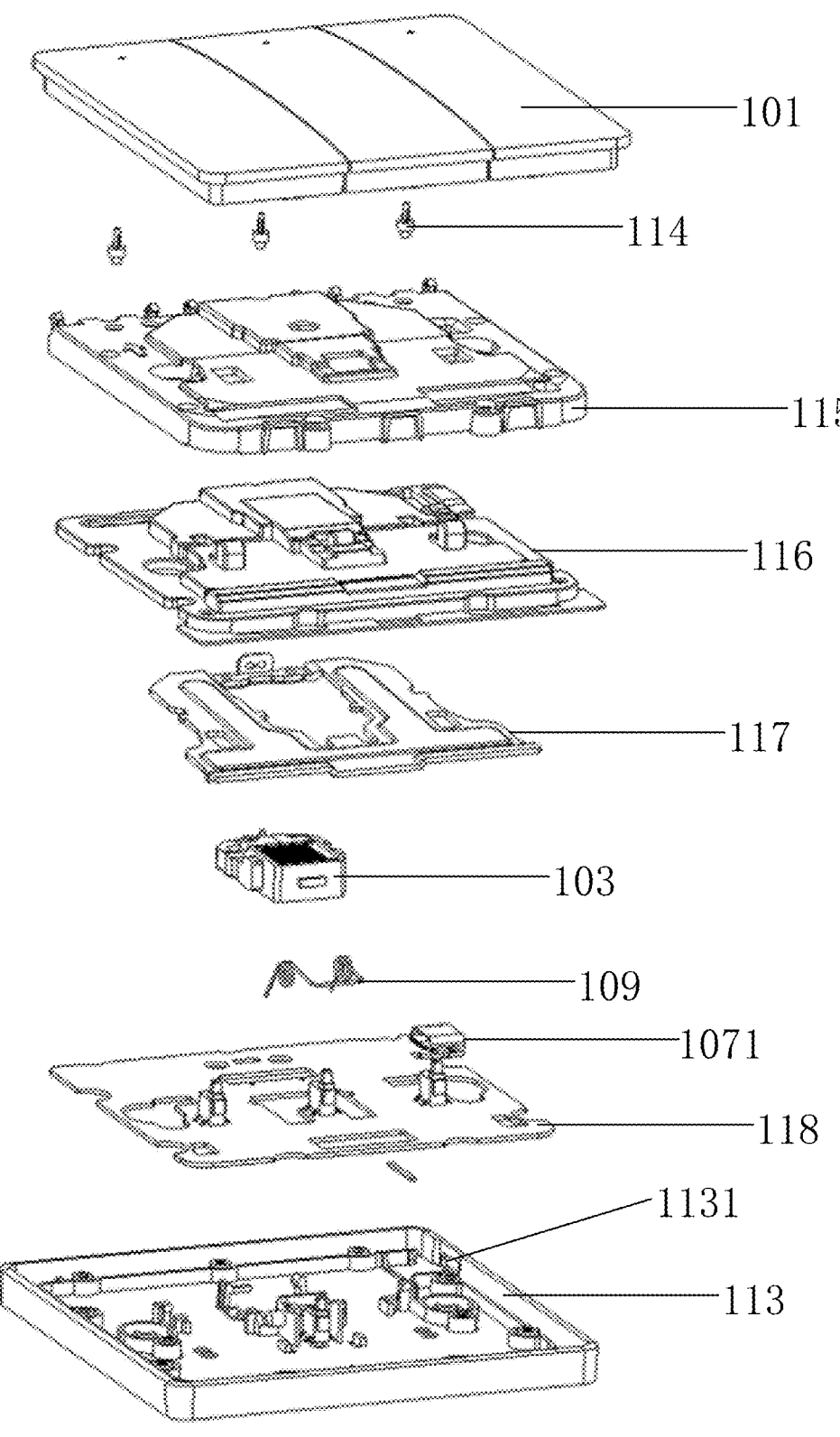
FIG. 6 is a schematic diagram of an exploded structure of a self-power generating switch adopting a power supply interface in an embodiment of the present invention.
Figure 7:
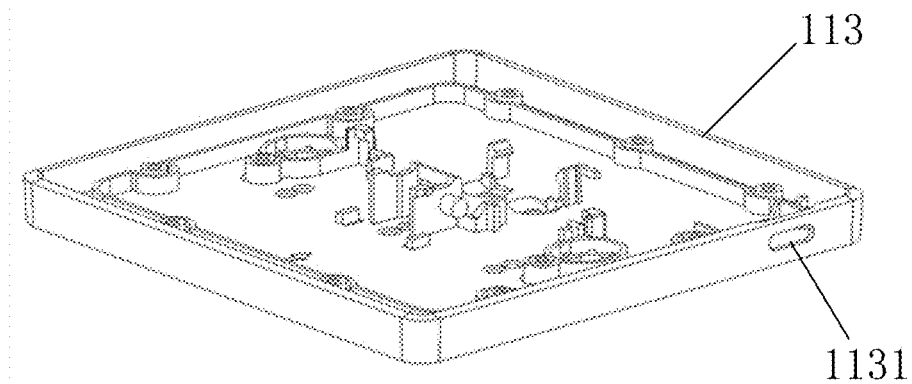
FIG. 7 is a schematic structural diagram of a bottom shell in an embodiment of the present invention.
Figure 8:
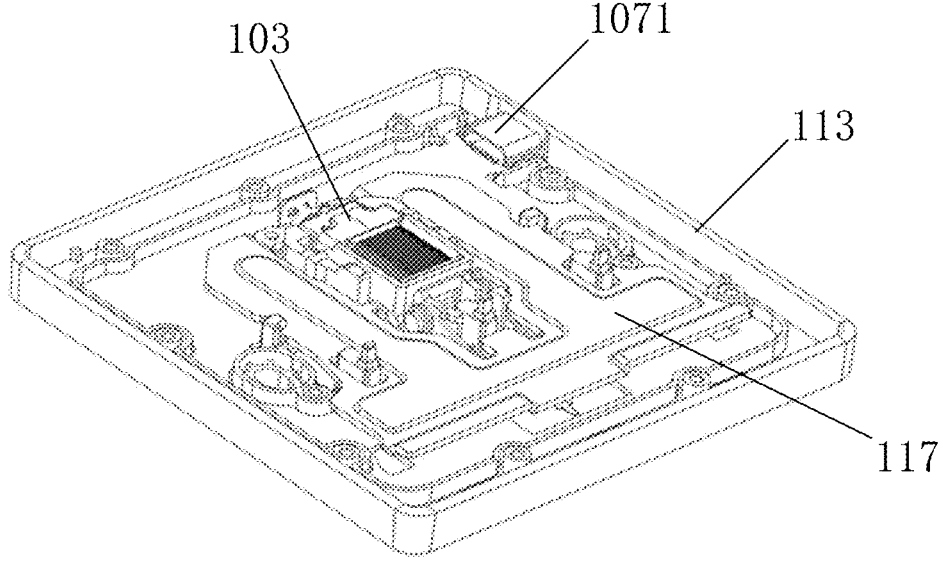
FIG. 8 is a first schematic diagram of parts of assembled structures of a self-power generating switch in an embodiment of the present invention.
Figure 9:
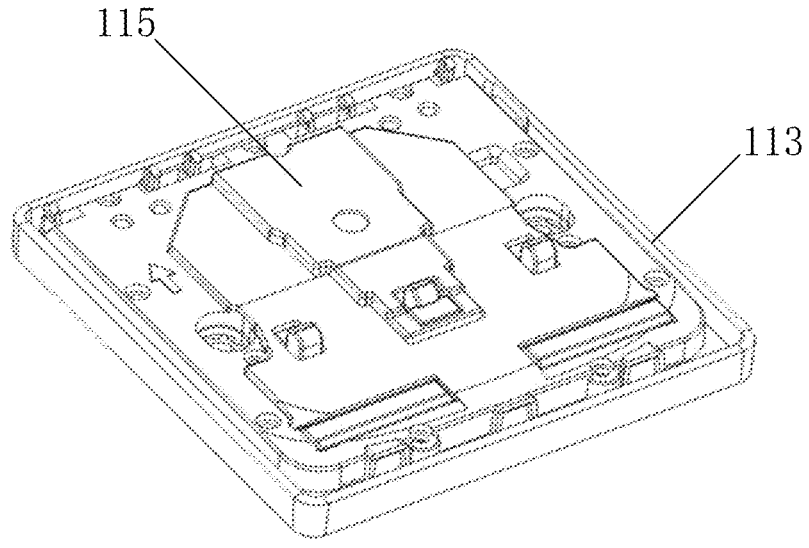
FIG. 9 is a second schematic diagram of parts of assembled structures of a self-power generating switch in an embodiment of the present invention.
Figure 10:
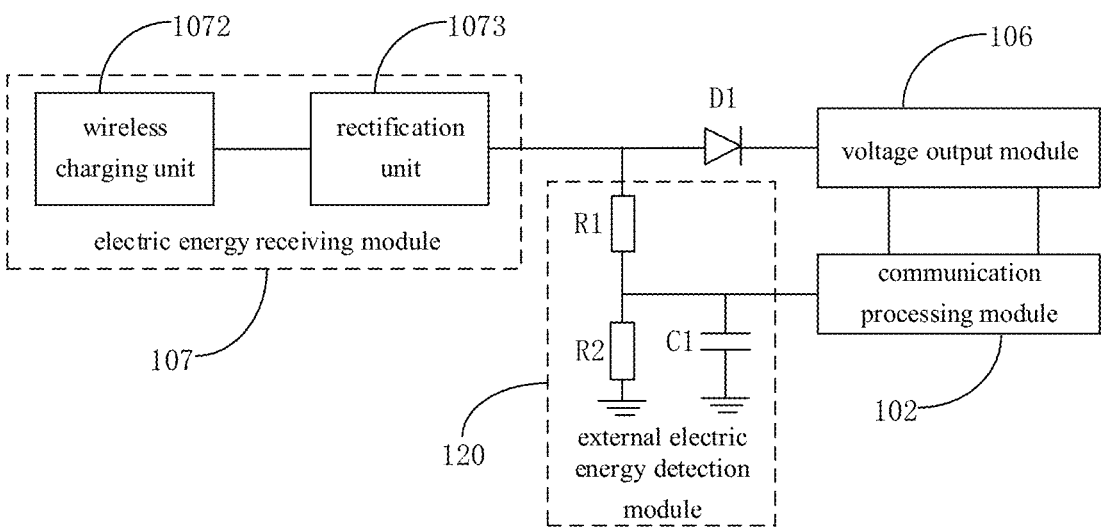
FIG. 10 is a second schematic diagram of a local structure of a self-power generating switch in an embodiment of the present invention.

In one of implementations, refer to FIG. 3, FIG. 4, and FIG. 10, the self-power generating switch 100 can further includes an external electrical energy detection module 120.

The external electrical energy detection module 120 is electrically connected to the electrical energy receiving module 107 and the communication processing module 102; for example, it can be electrically connected to an output side and/or input side of the electrical energy receiving module 107, and can be electrically connected to a signal interaction end of the communication processing module 102.

The external electrical energy detection module 120 is configured to: detect whether the electrical energy receiving module receives the external electrical energy, and feed a corresponding detection result back to the communication processing module 102.

The corresponding detection result is a first detection result or a second detection result, the first detection result represents that the electrical energy receiving module receives the external electrical energy, and the second detection result represents that the electrical energy receiving module does not receive the external electrical energy; specifically, the feedback of the detection result can be achieved by signals with different voltages (or levels) by means of a simulation quantity, and in other examples, the feedback of the detection result can also be achieved by digital signals.

Correspondingly, before performing network distribution of the self-power generating switch and a target network, the communication processing module 102 is further configured to: determine that the corresponding detection result is the first detection result.

Then, in above solution, the communication processing module 102 can perform network distribution only in the case that it is detected that there is the external electrical energy, which ensures that there is sufficient, continuous and stable electrical energy supply during network distribution.

In an example, refer to FIG. 4 and FIG. 10, the external electrical energy detection module 120 includes a first voltage division resistor R1, a second voltage division resistor R2, and a detection feedback capacitor C1.

A first end of the first voltage division resistor R1 is electrically connected to the electrical energy receiving module 107, a second end of the first voltage division resistor R1 is electrically connected to a first end of the second voltage division resistor R2, a second end of the second voltage division resistor R2 is grounded, a first end of the detection feedback capacitor C1 is electrically connected to the second end of the first voltage division resistor R1, and a second end of the first voltage division resistor R1 is electrically connected to the communication processing module 102.

Then, in the case that there is the external electrical energy, the divided voltage fed back to the communication processing module can have a certain voltage value or can be a voltage within a certain voltage range, and the voltage cannot be generated in the case that no external power is supplied. The purpose of voltage division is to prevent the communication processing module and the storage module from burning out due to an overhigh voltage. When the external electrical energy is cut off, the second voltage division resistor R2 can release the electrical energy in the detection feedback capacitor C1 to ensure that a processing apparatus can detect a low level.

In other examples, in order to further distinguish the external electrical energy from accidentally accessed electrical energy, a comparator can also be disposed between the first end of the detection feedback capacitor C1 and the communication processing module, thereby meeting a feedback demand.

In one of implementations, refer to FIG. 3, FIG. 4, and FIG. 10, a power supply diode D1 is further provided between the electrical energy receiving module 107 and the voltage output module 106, and an anode of the power supply diode D1 is connected to the electrical energy receiving module 107.

In one solution, refer to FIG. 4, the electrical energy receiving module 107 includes a power supply interface 1071 which can be, for example, a USB interface.

In one of implementations, refer to FIG. 4, the electrical energy receiving module includes a power supply interface which is a power supply female having a width of smaller than or equal to 7.8 mm and a height of smaller than or equal to 4.1 mm.

In a specific example in which the power supply interface is adopted, the electrical energy of the communication processing module is provided through the power supply interface, and thus, after detecting the external electrical energy, the external electrical energy detection module will output a high-level signal to the communication processing module; and if the electrical energy of the communication processing module is supplied by the power generator, the external electrical energy detection module will output a low-level signal to the communication processing module. When the self-power generating switch needs network distribution, a user firstly supplies power to the self-power generating switch by means of a data line (such as a USB line) through the power supply interface, and the electrical energy obtained by the power supply interface can be outputted to the communication processing module after being subjected to voltage reduction and voltage stabilization through the communication processing module 102. After the electrical energy obtained by the communication processing module is started, if it is detected that the external electrical energy detection module outputs a high level, it is regarded that the current power is supplied by the power supply interface, at the moment, a network distribution operation can be performed.

Since the power supply interface is stable in power supply voltage and sufficient in power, in an example of the communication processing module, if the target network is the zigbee network, a plurality of (such as sixteen) zigbee channels can be automatically polled to find a channel of the zigbee network, then, the network distribution message is sent, after the network distribution is successful, an LED indication that network distribution is successful is outputted, for example, a corresponding indication is outputted outwards through an LED module. For a user, network distribution can be completed by inserting the data line in the self-power generating switch to wait for the LED module to emit light, and after network distribution is completed, the data line is pulled up, which is simple and convenient to operate.

After the self-power generating switch is successful in network distribution, it is only necessary to send a simple zigbee control message, at the moment, the electrical energy receiving module no longer works, and power can be supplied by self-power generation. When a user presses the switch, electrical energy generated by an action of the power generator is outputted as stable electrical energy by the voltage output module after being processed, such as rectification and energy storage, and the voltage output module can achieve functions, such as voltage reduction and voltage stabilization, and adjust the voltage to a voltage required by the communication processing module, etc. After the communication processing module is started, it is detected that the external electrical energy detection module outputs a low level, and therefore, the electrical energy is supplied by the power generator; and according to information (such as a key value) read by a key recognition module and an action recognition module, the key value can be combined to form the control message to be sent through a zigbee protocol.

In one of implementations, refer to FIG. 5 to FIG. 9, the self-power generating switch further includes a bottom shell 113, a waterproof set 116, and a circuit board 118;

the waterproof set 116 is disposed on the bottom shell 113 so that a waterproof space is formed between a bottom surface of the bottom shell and the waterproof set, the switch circuit is disposed on the circuit board 118, the circuit board 118 is disposed on the bottom shell 113, and the switch circuit is disposed in the waterproof space.

The power supply interface 1071 is disposed on the bottom shell 113 and is electrically connected to the voltage output module through the circuit board 118, and the power supply interface 1071 is located outside the waterproof set. Specifically, the bottom shell 113 can be provided with a connecting hole 1131, and the power supply interface 1071 can be disposed in the connecting hole 1131.

In above solution, the power supply interface 1071 is disposed outside a waterproof area, and thus, a waterproof function is mainly to protect electronic components except for the power supply interface and the power generator. In this way, it is beneficial to the reduction of the cost (a waterproof USB is expensive) and the simplification of design.

In addition, the power supply interface can be located under (on a middle shell) the key or a side of the switch, in this way, no charging interface can be seen, which improves the sense of beauty.

Figure 11:
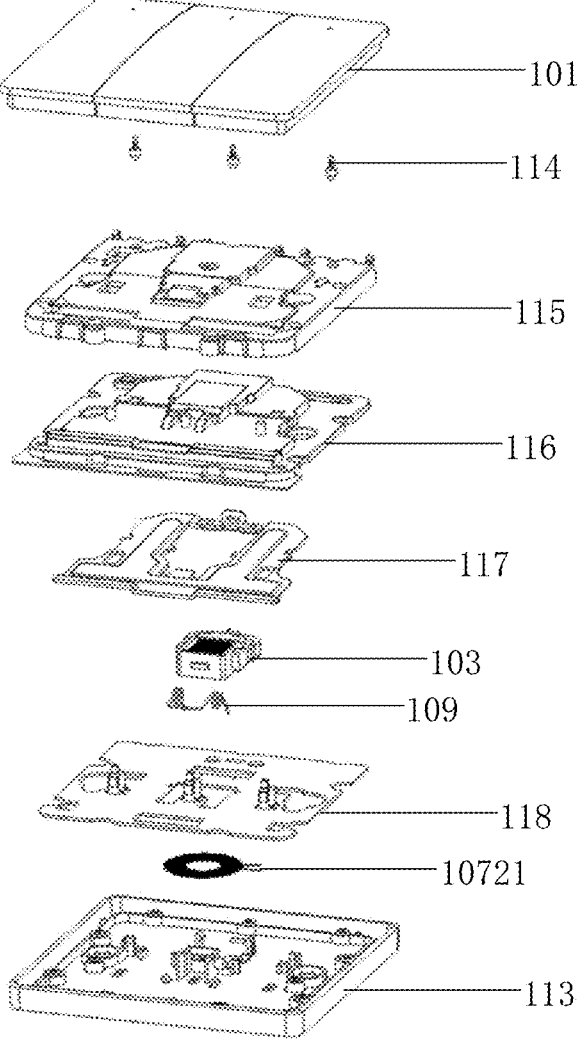
FIG. 11 is a schematic diagram of an exploded structure of a self-power generating switch adopting a wireless charging unit in an embodiment of the present invention.

In a solution, refer to FIG. 10 and FIG. 11, the electrical energy receiving module 107 includes a wireless charging unit 1072, and the external electrical energy is acquired wirelessly. With FIG. 11 as an example, the wireless charging unit 1072 can include a wireless charging coil. In addition, the wireless charging unit can be used as a data exchange medium in addition to achieving charging.

In a further example, the electrical energy receiving module 107 can further include a rectification unit 1073 which is connected to the wireless charging unit 1072 and the voltage output module 106, and then, can rectify the electrical energy acquired by the wireless charging unit and transmit the rectified electrical energy to the voltage output module 106.

In a specific example in which the wireless charging unit 1072 is adopted and the target network is the zigbee network, when a user requires network distribution, a self-power generating switch device is put on a wireless charging stand, and network distribution is successful after the LED module (such as an LED lamp) is lighted. A zigbee network device can be controlled by leaving the self-power generating switch from the wireless charging stand and pressing the switch. A specific network distribution process and a control message sending process can be understood with reference to an implementation in which the power supply interface is adopted.

In one of implementations, with FIG. 11 as an example, in the self-power generating switch adopting the wireless charging unit, the bottom shell 113, the circuit board 118, the waterproof set 116, etc. mentioned as above can also be adopted.

In addition, refer to FIG. 5 to FIG. 9, and FIG. 11, the self-generating switch 100 can further include a driving component 117, a middle shell 115 and a light guide component 114 no matter whether the wireless charging unit or the power supply interface is adopted, driving between the key 101 and the power generator 103 can be achieved by the driving component, the middle shell 115 can cover an upper side of the waterproof set 116, the key 101 can be movably connected to the middle shell 115 or the bottom shell 113, and the light guide component 114 can pass through the middle shell 115, the key 101 and the middle shell 115 and extends to the LED module on the circuit board 118, thereby achieving light guide to the outside of the self-power generating switch 100.

In one of implementations, when generating a control message, the communication processing module is specifically configured to: acquire current control information; the current control information representing control currently received by the self-power generating switch; and write the current control information into the control message.

The current control information can be understood as the key value mentioned as above.

When generating a control message, the communication processing module is further configured to:

acquire switch information, the switch information representing the self-power generating switch; and write the switch information and control safety information into the control message, so that the gateway of the target network verifies that the switch information is passed, and after the gateway or a corresponding device in the target network verifies that the control safety information is passed, the corresponding device executes a control result corresponding to the control message.

The current control information includes current key information representing that a controlled key is received currently; refer to FIG. 3, the self-power generating switch 100 further includes a key recognition module 110 for detecting the current key information, and the key recognition module 110 is electrically connected to the communication processing module.

In a further example, the key recognition module 110 includes at least one detection unit 1101, a detection switch is directly or indirectly driven by the corresponding key, and the detection unit is electrically connected to the communication processing module; and the detection unit is configured to feed a switch signal back to the communication processing module when an action of downwardly pressing of the corresponding key occurs, so that the communication processing module is arranged to determine the current key information based on the switch signal.

In an example, the detection unit includes a microswitch directly or indirectly driven by the corresponding key and electrically connected to the communication processing module;

the detection switch is configured to be touched by the corresponding key when the action of downwardly pressing of the corresponding key occurs, and feed the switch signal back to the communication processing module after the detection switch is touched.

Figure 12:
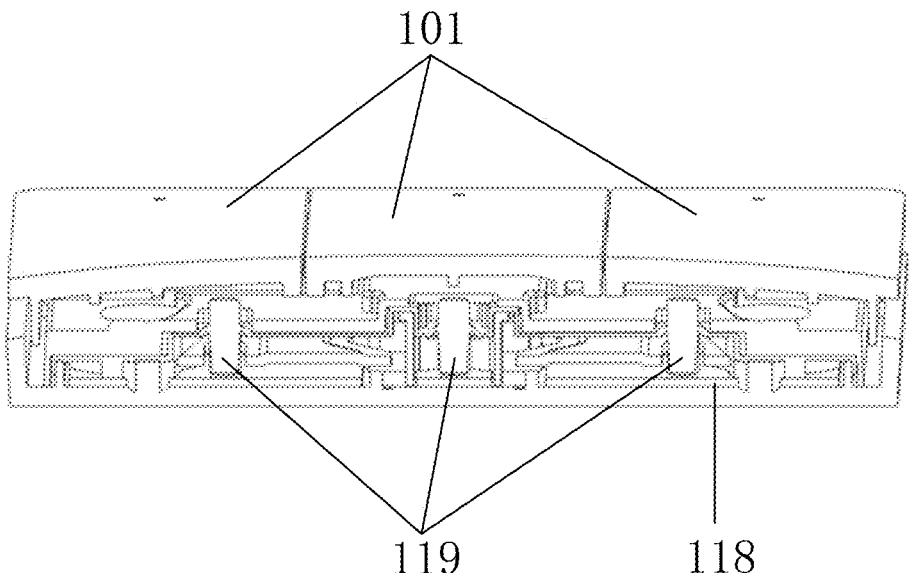
FIG. 12 is a first schematic structural diagram of a self-power generating switch with a silica gel column, a first conductive part and a second conductive part in an embodiment of the present invention.
Figure 13:
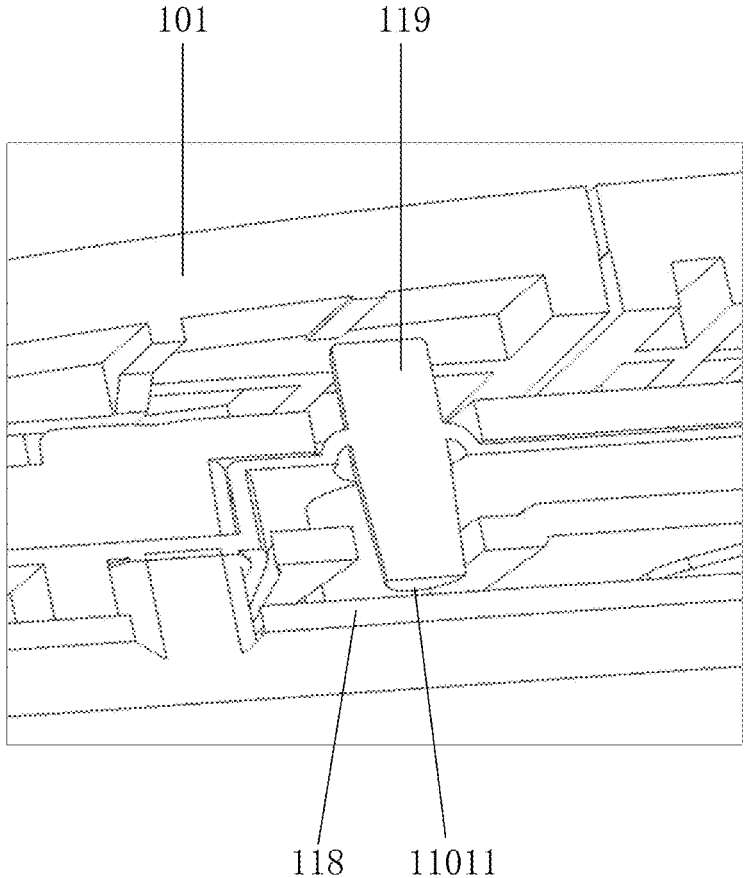
FIG. 13 is a second schematic structural diagram of a self-power generating switch with a silica gel column, a first conductive part and a second conductive part in an embodiment of the present invention.
Figure 14:
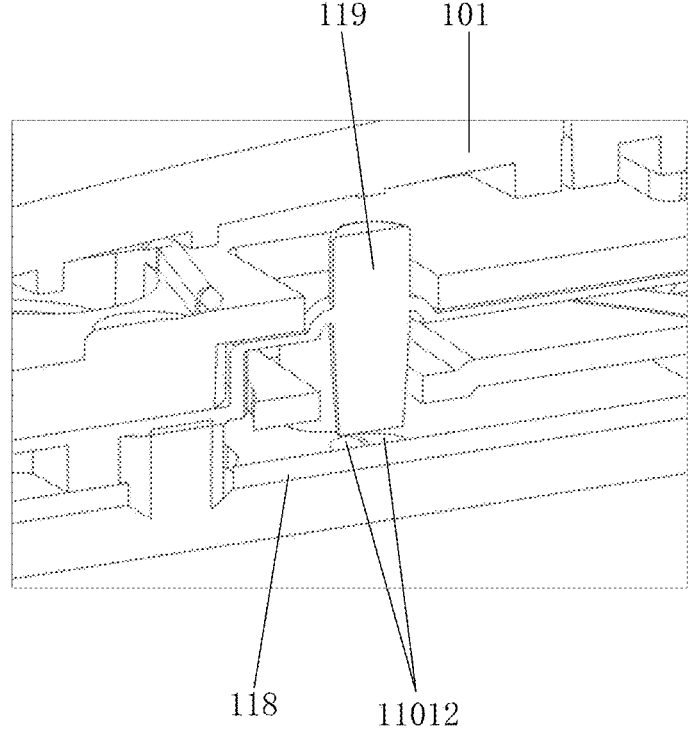
FIG. 14 is a third schematic structural diagram of a self-power generating switch with a silica gel column, a first conductive part and a second conductive part in an embodiment of the present invention.

In another example, refer to FIG. 12 to FIG. 14, the self-power generating switch further includes a silica gel column 119;

the detection unit 1101 includes a first conductive part 11011 and a second conductive part 11012 disposed on the circuit board 118, the first conductive part 11011 is disposed on a tail end, facing the circuit board 118, of the silica gel column 119, and the second conductive part 11012 is electrically connected to the communication processing module.

The silica gel column 119 is driven by the key 101 and is configured to be touched by the corresponding key to move to the circuit board when the action of downwardly pressing of the corresponding key occurs;

the first conductive part 11011 is configured to move with the silica gel column to the circuit board when the silica gel column moves to the circuit board, and be conducted to be in contact with the second conductive part after moving; and the second conductive part 11012 is configured to feed the switch signal back to the communication processing module when being conducted to be in contact with the first conductive part.

The first conductive part can include, for example, conductive particles and/or conductive ink. The first conductive part is suitable for being disposed in a silica gel material and achieving conduction.

In a further example, the second conductive part 11012 includes a first connective subpart and a second conductive subpart (i.e., two second conductive parts 11012) separated in FIG. 14) which are both electrically connected to the communication processing module; and when the first conductive part is conducted to be in contact with the second conductive part, the first conductive part is conducted and connected between the first conductive subpart and the second conductive subpart.

In addition, the silica gel column 119 can be disposed in the waterproof set 116, and in the case that the waterproof set 116 is made of a silica gel material, the silica gel column 119 and the waterproof set 116 can be integrated.

In one of implementations, refer to FIG. 3, the current control information includes current action information representing whether the current received control is an action of downwardly pressing of the key or an action of rebounding the key, the self-power generating switch further includes an action recognition module 111 for recognizing the current action information, and the action recognition module 111 is electrically connected to the power generator 103 and the communication processing module 102.

In addition, the reset component 109 is configured to be directly or indirectly driven by the movement part of the power generator, the reset component is arranged to deform in response to the movement of the movement part in the first direction and generating a reset action force overcoming the deformation, and the reset component is further arranged to drive the movement part to move in a second direction and the key to rebound by means of the reset action force after an action force for downwardly pressing of the key is removed.

The induction part is arranged to generate a second induction voltage when the movement part moves in the second direction; and the rectification module is further configured to store second electrical energy corresponding to the second induction voltage into the energy storage module.

In a specific example of the present invention, when the target network is the Bluetooth network, in network distribution and control processes of the processing system, for example:

the self-power generating switch achieves long-time power supply by the power supply interface or other ways. After poweron, if the self-power generating switch is in the network undistributed state, discoverable and linkable beacons are continuously sent through Blueteeth. A scanning mode of the mobile terminal (such as a mobile phone app) is started, after the self-power generating switch is scanned, a process of exchanging the key with the self-power generating switch is completed, the key (i.e., the safety information which can be, for example, specifically the network access password) will be stored by a semi-self-power generation Bluetooth wireless switch, and thus, the access of a device to a network can be achieved.

Then, for a gateway (such as an intelligent sound box or gateway device), with a Bluetooth gateway function, similarly, the mobile terminal (such as the mobile phone app) can scan a gateway (such as the intelligent sound box or gateway device) and complete the access of the gateway (such as intelligent sound box or gateway device) to a network.

When the self-power generating switch and the gateway (such as an intelligent sound box or gateway device) belong to the same network secret key, power supplied to the self-power generating switch is removed to make the self-power generating switch enter a self-power generation state, generation is achieved by pressing the self-power generating switch, the self-power generating switch can send a series of beacon events (until the power is used up) by means of the energy, the gateway (such as the intelligent sound box or gateway device) is always in a Bluetooth broadcast monitoring state, and thus, the gateway (such as the intelligent sound box or gateway device) can receive the beacon events of the self-power generating switch.

After receiving the beacon events of the self-power generating switch, the gateway (such as the intelligent sound box or gateway device) can report the events to the IoT cloud. The mobile terminal (such as the mobile phone app) can acquire, from the IoT cloud, an event that the self-power generating switch is pressed down.

In addition, a starting process of the self-power generating switch can be that, for example:

after the power supplied to the self-power generating switch is removed, pressing generation is adopted, firstly, it is determined whether network distribution has been performed, if network distribution has been performed, the network secret key (such as the safety information which can be, for example, specifically the network access password) and a serial number of a message (since a Bluetooth message will be sent in a plurality of packets once, the serial number is used for deduplication) are read from a memory, the serial number is increased by 1, which represents a new message, and the updated serial number is stored. An effective load of the message is encrypted according to the network secret key and the serial number, and after the encryption is completed, a Bluetooth beacon message is continuously sent until the power is used up.

Refer to FIG. 15, an embodiment of the present invention further provides a processing method for the self-power generating switch, including:

S401: when the key is pressed downwardly, the movement part is driven to move in a first direction, S402: the induction part generates a first induction voltage when the movement part moves in the first direction, S403: the energy storage module stores first electrical energy corresponding to the first induction voltage, and transmits the stored electrical energy to the voltage output module;

S404: when receiving external electrical energy transmitted from the outside of the self-power generating switch, the electrical energy receiving module transmits the external electrical energy to the voltage output module by the electrical energy receiving module;

S405: the voltage output module outputs required power supply voltages to the communication processing module and the storage module by means of the electrical energy transmitted by the energy storage module, so that the communication processing module and the storage module are powered on;

S406: in the case that the electrical energy receiving module receives the external electrical energy, the communication processing module performs network distribution of the self-power generating switch and a target network after the communication processing module and the storage module are powered on; and S407: in the case that the power generator converts mechanical energy into electrical energy, the communication processing module generates a control message, and sends the control message through the target network the after the communication processing module and the storage module are powered on.

Optionally, before the communication processing module performs network distribution of the self-power generating switch and a target network, the processing method further includes:

the communication processing module determines that the self-power generating switch is in a network undistributed state.

Optionally, before the communication processing module performs network distribution of the self-power generating switch and a target network, the processing method further includes:

the communication processing module determines that the self-power generating switch is in a network distributed state, but is detected to find a reset operation, the reset operation being configured to indicate the communication processing module to reperform the network distribution.

Optionally, the step that the communication processing module performs network distribution of the self-power generating switch and a target network specifically includes:

the communication processing module sends a network distribution message to the outside of the self-power generating switch, so that a mobile terminal acquiring the network distribution message feeds safety information of the target network back to the self-power generating switch; and the communication processing module stores the safety information into the storage module so as to complete network distribution with the target network based on the safety information.

Optionally, the self-power generating switch further includes an external electrical energy detection module; the external electrical energy detection module is electrically connected to the electrical energy receiving module and the communication processing module;

the processing method further includes:

the external electrical energy detection module detects whether the electrical energy receiving module receives the external electrical energy, and feeds a corresponding detection result back to the communication processing module; the corresponding detection result being a first detection result or a second detection result, the first detection result representing that the electrical energy receiving module receives the external electrical energy, and the second detection result representing that the electrical energy receiving module does not receive the external electrical energy;

before the communication processing module performs network distribution of the self-power generating switch and a target network, the processing method further includes: the communication processing module determines that the corresponding detection result is the first detection result.

Optionally, the processing method further includes:

in the case that the electrical energy receiving module receives the external electrical energy, after the network distribution is completed, the communication processing module takes a channel of the target network as a target channel, and stores information of the target channel into the storage module; and correspondingly, the control message is sent through the target channel.

Optionally, the step that the communication processing module performs network distribution of the self-power generating switch and a target network specifically includes:

the communication processing module sends a channel seeking message by means of a current channel; and if a response signal of the channel seeking message is received, the communication processing module sends a network distribution message by means of the current channel, so that a gateway of the target network adds the self-power generating switch into the target network; and the step that the communication processing module takes a channel of the target network as a target channel, and stores information of the target channel into the storage module specifically includes:

if the response signal of the channel seeking message is received, the communication processing module takes the current channel as the target channel, and stores the information of the target channel into the storage module.

Optionally, after the communication processing module sends a channel seeking message by means of a current channel, the processing method further includes:

if the response signal of the channel seeking message is not received, the communication processing module switches a channel, and takes the switched channel as a new current channel, so that the channel seeking message is sent through the new current channel.

Optionally, the step that the communication processing module generates a control message specifically includes:

the communication processing module acquires current control information; the current control information representing control currently received by the self-power generating switch;

the communication processing module writes the current control information into the control message.

Optionally, the step that the communication processing module generates a control message further includes:

the communication processing module acquires switch information, the switch information representing the self-power generating switch; and the communication processing module writes the switch information and control safety information into the control message, so that the gateway of the target network verifies that the switch information is passed, and after the gateway or a corresponding device in the target network verifies that the control safety information is passed, the corresponding device executes a control result corresponding to the control message.

Optionally, the self-power generating switch further includes a reset component;

the reset component is configured to be directly or indirectly driven by the movement part of the power generator; and the processing method further includes:

the reset component deforms in response to the movement of the movement part in the first direction and generates a reset action force overcoming the deformation, and the reset component drives the movement part to move in a second direction and the key to rebound by means of the reset action force after an action force for downwardly pressing of the key is removed;

the induction part is arranged to generate a second induction voltage when the movement part moves in the second direction; and the rectification module stores second electrical energy corresponding to the second induction voltage into the energy storage module.

In the description of the present specification, the description with reference to terms "an implementation", "an embodiment", "specific implementation process" and "an example" is intended to indicate that a specific feature, structure, material or characteristic described in conjunction with the embodiment or example is included in at least one embodiment or example of the present invention. In the present specification, the schematic statement for above-mentioned terms does not necessarily refer to the same embodiment or example. Moreover, the described specific feature, structure, material or characteristic may be combined in an appropriate way in any one or more embodiments or examples.

Finally, it should be noted that above-mentioned embodiments are only intended to describe the technical solutions of the present invention, rather than to limit the technical solutions of the present invention. Although the present invention has been described in detail with reference to the aforementioned embodiments, it should be understood by those of ordinary skill in the art that they may still modify the technical solutions recorded in all of the foregoing embodiments or equivalently substitute parts or all of technical features therein. These modifications or substitutions do not make the essences of the corresponding technical solutions depart from the scope of the technical solutions of the embodiments of the present invention.

The invention claimed is:

1. A self-power generating switch, characterized by comprising:

at least one key, at least parts of the key are arranged to displace in response to an external action, and the external action comprising an action of downwardly pressing of the key;

a power generator, the power generator is arranged to convert mechanical energy into electrical energy in response to the displacement; and a switch circuit; the switch circuit comprises a communication processing module, an energy storage module, a rectification module, a voltage output module, a storage module, and an electrical energy receiving module;

the power generator comprises an induction part and a movement part; the communication processing module being electrically connected to the storage module, the induction part being electrically connected to the energy storage module through the rectification module, and the energy storage module being electrically connected to the communication processing module and the storage module through the voltage output module; the key being directly or indirectly driven by the movement part; wherein the movement part is configured to be driven to move in a first direction when the key is pressed downwardly; the induction part is arranged to generate a first induction voltage in response to the movement of the movement part in the first direction; the rectification module is arranged to rectify a first electrical energy corresponding to the first induction voltage and then storing the rectified first electrical energy in the energy storage module; and the energy storage module is arranged to transmit the stored electrical energy to the voltage output module;

the electrical energy receiving module being directly or indirectly electrically connected to the voltage output module; and the electrical energy receiving module being configured to: when receiving external electrical energy transmitted from the outside of the self-power generating switch, transmit the external electrical energy to the voltage output module;

the voltage output module is arranged to output required power supply voltages to the communication processing module and the storage module by means of the transmitted electrical energy, so that the communication processing module and the storage module are powered on;

the communication processing module being configured to: in the case that the electrical energy receiving module receives the external electrical energy, perform network distribution of the self-power generating switch and a target network after the communication processing module and the storage module are powered on; and the communication processing module being configured to: in the case that the power generator converts the mechanical energy into the electrical energy, generate a control message, and send the control message through the target network after the communication processing module and the storage module are powered on.

2. The self-power generating switch according to claim 1, characterized in that when performing network distribution of the self-power generating switch and the target network, the communication processing module is specifically configured to:

send a network distribution message to the outside of the self-power generating switch, so that a mobile terminal acquiring the network distribution message feeds safety information of the target network back to the self-power generating switch; and store the safety information in the storage module.

3. The self-power generating switch according to claim 1, characterized by further comprising an external electrical energy detection module; the external electrical energy detection module being electrically connected to the electrical energy receiving module and the communication processing module;

the external electrical energy detection module being configured to: detect whether the electrical energy receiving module receives the external electrical energy, and feed a corresponding detection result back to the communication processing module; the corresponding detection result being a first detection result or a second detection result, the first detection result representing that the electrical energy receiving module receives the external electrical energy, and the second detection result representing that the electrical energy receiving module does not receive the external electrical energy;

before performing network distribution of the self-power generating switch and the target network, the communication processing module being further configured to: determine that the corresponding detection result is the first detection result.

4. The self-power generating switch according to claim 1, characterized in that the communication processing module is further configured to:

in the case that the electrical energy receiving module receives the external electrical energy, after the network distribution is completed, take a channel of the target network as a target channel, and store information of the target channel into the storage module; and correspondingly, the control message is sent through the target channel.

5. The self-power generating switch according to claim 4, characterized in that when performing network distribution of the self-power generating switch and the target network, the communication processing module is specifically configured to:

send a channel seeking message by means of a current channel; and if a response signal of the channel seeking message is received, send a network distribution message by means of the current channel, so that a gateway of the target network adds the self-power generating switch into the target network; and when taking the channel of the target network as the target channel, and storing information of the target channel in the storage module, the communication processing module is configured to:

if the response signal of the channel seeking message is received, take the current channel as the target channel, and store the information of the target channel in the storage module.

6. The self-power generating switch according to claim 5, characterized in that after sending the channel seeking message by means of the current channel, the communication processing module is further configured to:

if the response signal of the channel seeking message is not received, switch a channel, and take the switched channel as a new current channel, so that the channel seeking message is sent through the new current channel.

7. The self-power generating switch according to claim 1, characterized by further comprising a bottom shell, a waterproof set, and a circuit board; the waterproof set being disposed on the bottom shell so that a waterproof space is formed between a bottom surface of the bottom shell and the waterproof set, the switch circuit being disposed on the circuit board, the circuit board being disposed on the bottom shell, and the switch circuit being disposed in the waterproof space.

8. The self-power generating switch according to claim 7, characterized in that the electrical energy receiving module comprises a power supply interface, the power supply interface is disposed on the bottom shell and is electrically connected to the voltage output module through the circuit board, and the power supply interface is located outside the waterproof set.

9. The self-power generating switch according to claim 1, characterized in that the electrical energy receiving module comprises a wireless charging unit, and the external electrical energy is acquired wirelessly.

10. The self-power generating switch according to claim 1, characterized in that when generating the control message, the communication processing module is specifically configured to:

acquire current control information; the current control information representing control currently received by the self-power generating switch; and write the current control information into the control message.

11. The self-power generating switch according to claim 10, characterized in that when generating the control message, the communication processing module is further configured to:

acquire switch information, the switch information representing the self-power generating switch; and write the switch information and control safety information into the control message, so that the gateway of the target network verifies that the switch information is passed, and after the gateway or a corresponding device in the target network verifies that the control safety information is passed, the corresponding device executes a control result corresponding to the control message.

12. The self-power generating switch according to claim 11, characterized in that the current control information comprises current key information representing that a controlled key is received currently; and the self-power generating switch further comprises a key recognition module for detecting the current key information, and the key recognition module is electrically connected to the communication processing module.

13. The self-power generating switch according to claim 12, characterized in that the key recognition module comprises at least one detection unit, a detection switch is directly or indirectly driven by the corresponding key, and the detection unit is electrically connected to the communication processing module; and the detection unit is configured to feed a switch signal back to the communication processing module when the action of downwardly pressing of the corresponding key occurs, so that the communication processing module is arranged to determine the current key information based on the switch signal.

14. The self-power generating switch according to claim 13, characterized in that the detection unit comprises a microswitch directly or indirectly driven by the corresponding key and electrically connected to the communication processing module;

the detection switch is configured to be touched by the corresponding key when the action of downwardly pressing of the corresponding key occurs, and feed the switch signal back to the communication processing module after the detection switch is touched.

15. The self-power generating switch according to claim 13, characterized by further comprising a silica gel column;

the detection unit comprising a first conductive part and a second conductive part disposed on the circuit board, the first conductive part being disposed on a tail end, facing the circuit board, of the silica gel column, and the second conductive part being electrically connected to the communication processing module;

the silica gel column being driven by the key and being configured to be touched by the corresponding key to move to the circuit board when the action of downwardly pressing of the corresponding key occurs;

the first conductive part being configured to move with the silica gel column to the circuit board when the silica gel column moves to the circuit board, and be conducted to be in contact with the second conductive part after moving; and the second conductive part being configured to feed the switch signal back to the communication processing module when being conducted to be in contact with the first conductive part.

16. The self-power generating switch according to claim 15, characterized in that the first conductive part comprises conductive particles and/or conductive ink.

17. The self-power generating switch according to claim 15, characterized in that the second conductive part comprises a first connective subpart and a second conductive subpart which are both electrically connected to the communication processing module; and when the first conductive part is conducted to be in contact with the second conductive part, the first conductive part is conducted and connected between the first conductive subpart and the second conductive subpart.

18. The self-power generating switch according to claim 10, characterized in that the current control information comprises current action information representing whether the current received control is the action of downwardly pressing of the key or an action of rebounding the key, the self-power generating switch further comprises an action recognition module for recognizing the current action information, and the action recognition module is electrically connected to the power generator and the communication processing module.

19. A processing system based on a switch, characterized by comprising the self-power generating switch according to claim 1 and the target network.

20. A processing method for a self-power generating switch, characterized in that the self-power generating switch comprises at least one key, a power generator, and a switch circuit; the switch circuit comprises a communication processing module, an energy storage module, a rectification module, a voltage output module, a storage module, and an electrical energy receiving module; the power generator comprises an induction part and a movement part; the communication processing module is electrically connected to the storage module, the induction part is electrically connected to the energy storage module through the rectification module, and the energy storage module is electrically connected to the communication processing module and the storage module through the voltage output module; the key is directly or indirectly driven by the movement part; and the electrical energy receiving module is directly or indirectly electrically connected to the voltage output module; and the processing method comprises:

when the key is pressed downwardly, driving the movement part to move in a first direction, generating a first induction voltage by the induction part when the movement part moves in the first direction, storing first electrical energy corresponding to the first induction voltage, and transmitting the stored electrical energy to the voltage output module by the energy storage module;

when receiving external electrical energy transmitted from the outside of the self-power generating switch, transmitting the external electrical energy to the voltage output module by the electrical energy receiving module;

outputting required power supply voltages to the communication processing module and the storage module by the voltage output module by means of the electrical energy transmitted by the energy storage module, so that the communication processing module and the storage module are powered on;

in the case that the electrical energy receiving module receives the external electrical energy, performing network distribution of the self-power generating switch and a target network by the communication processing module after the communication processing module and the storage module are powered on; and in the case that the power generator converts mechanical energy into electrical energy, generating a control message, and sending the control message through the target network by the communication processing module after the communication processing module and the storage module are powered on.

* * * * *